March 7, 1933. L. J. HIGGINBOTHAM 1,899,962
ILLUMINATED CHANGEABLE DISPLAY DEVICE AND METHOD OF PRODUCING THE SAME
Filed March 2, 1931   2 Sheets-Sheet 1

Inventor
Luther J. Higginbotham
By Jack A. Ashley
Attorney

March 7, 1933.    L. J. HIGGINBOTHAM    1,899,962
ILLUMINATED CHANGEABLE DISPLAY DEVICE AND METHOD OF PRODUCING THE SAME
Filed March 2, 1931    2 Sheets-Sheet 2

Inventor
Luther J. Higginbotham
By Jack A. Ashley
Attorney

Patented Mar. 7, 1933

1,899,962

UNITED STATES PATENT OFFICE

LUTHER J. HIGGINBOTHAM, OF DALLAS, TEXAS

ILLUMINATED CHANGEABLE DISPLAY DEVICE AND METHOD OF PRODUCING THE SAME

Application filed March 2, 1931. Serial No. 519,671.

This invention relates to new and useful improvements in illuminated changeable display devices and the method of producing the same.

One object of the invention is to produce by photography a display device, whereby two views dealing with a common subject matter may be alternately displayed when a light in rear of the display is alternately lighted and extinguished.

A further object of the invention is to produce by photography a pair of transparencies in which all elements will exactly register in outline and position, except those particular parts or portions which are to show the alternate changes, and these being so associated as not to show distortion, but to give a natural appearance when alternately displayed.

A particular object of the invention is to bring the photographic reproductions into such close contact as to prevent lateral light rays from entering therebetween and causing blurring or distortion, which would prevent a sharp outline. The advantage of this arrangement is that the photographs will at all times present clear and sharp configurations and the diffusion of light rays will be such as to sharply display the rear photograph without any interference or distortion because of the front photograph through which the light rays will also be projected.

A construction designed to carry out the invention will be hereinafter described together with other features of the invention.

The invention will be more readily understood from a reading of the following specification and by reference to the accompanying drawings in which an example of the invention is shown, and wherein.

Figure 3:
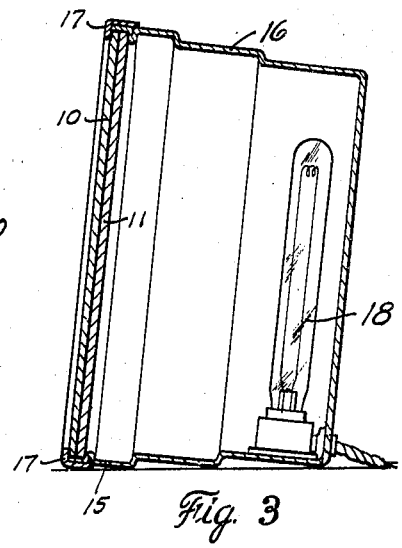
Figure 4:
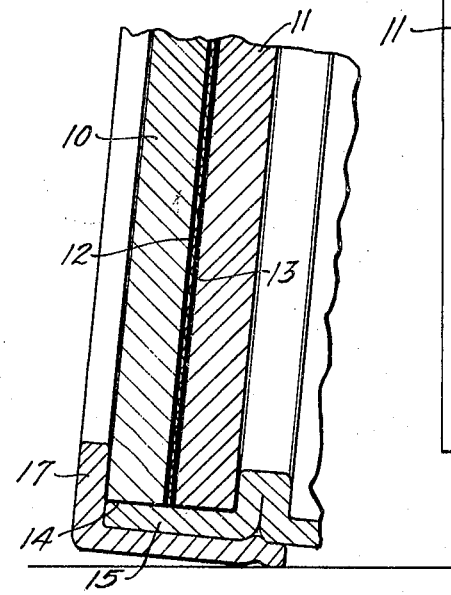
Figure 6:
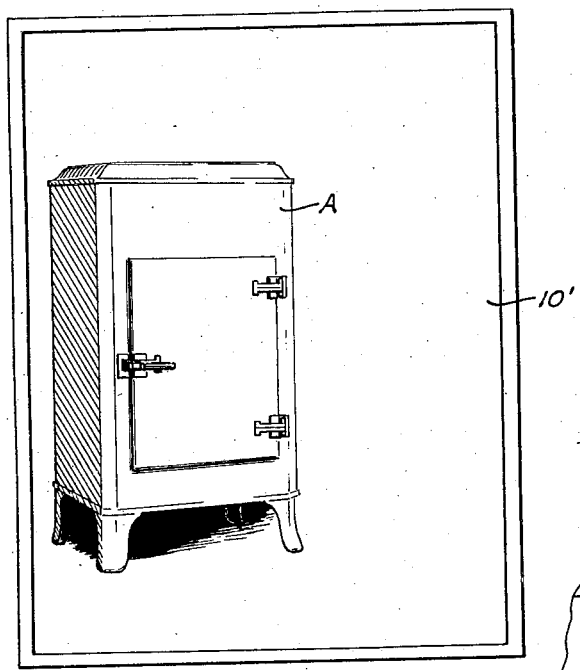
Figure 5:
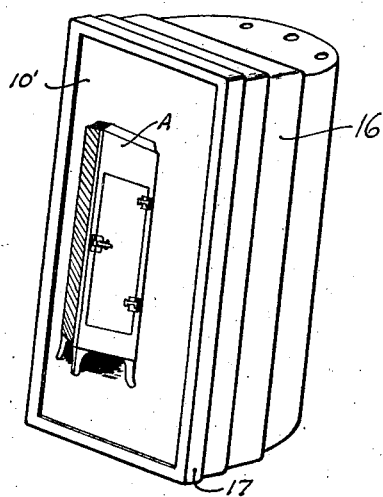
Figure 7:
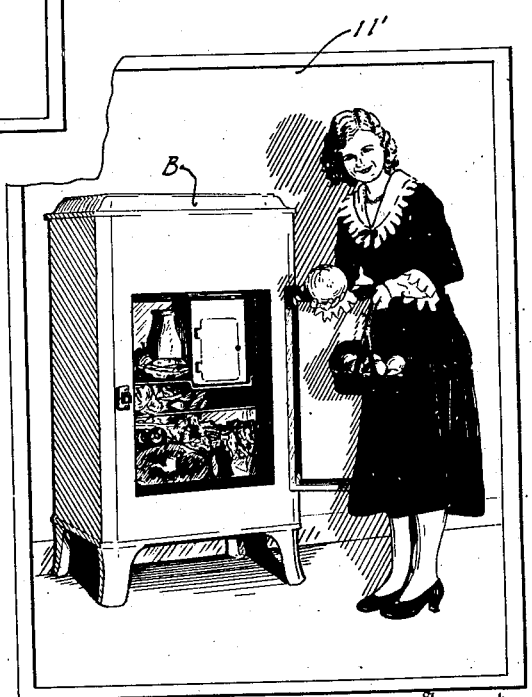

Figure 3 is a vertical sectional view of a display device constructed in accordance with the invention, Figure 4 is an enlarged sectional view of the lower portion of the assembled portions, Figure 5 is an isometrical view of the device shown in Figure 3, Figure 6 is an elevation of the front plate or transparency showing another form of the invention, and Figure 7 is an elevation of the rear plate or transparency used in connection with Figure 6.

In the drawings the numeral 10 designates a front plate or transparency and 11 a rear plate or transparency. These plates are preferably made of clear glass such as is commonly employed in the photographic art for producing transparencies, but any material suitable for the purposes of the invention could be employed. In preparing the plates, the rear side of the front plate 10 is provided with a sensitized coating 12 suitable for photographic reproduction and the front side of the rear plate 11 is provided with a similar coating 13, so that when the plates are assembled the emulsion surfaces will be in juxta-position.

Figure 1:
Figure 1 is an elevation of the front plate or transparency.
Figure 2:
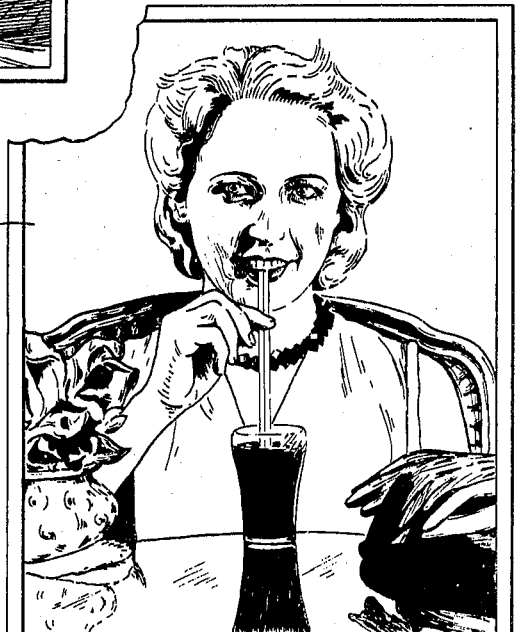
Figure 2 is a front view of the rear plate or transparency.

In carrying out the method the subject to be photographed is posed for the picture. In Figures 1 and 2 the picture of a young lady is shown in the act of drinking a beverage from a glass through straws. In Figure 1 the eyelids are lowered and the image appears to be looking into the glass in the act of drawing the beverage through the straws. In Figure 2 the young lady is smiling with the eyelids raised and the mouth open, thus giving an expression of satisfaction over the draught.

The negative for printing the picture shown in Figure 1 is first produced and then the second negative for producing the picture of Figure 2 is made. It is obvious that two separate and distinct photographic operations are necessary to produce the two negatives, and except for the changes in the eyelids and mouth all parts of these two separate photographs must exactly register and the corresponding parts in the two negatives must be of exactly the same size; therefore, one of the important steps in carrying out the method is the production of two separate photographs in which the corresponding elements must register as to size and position.

To produce the plate shown in Figure 1, a negative is produced on a film and the glazed or reverse side of the film is placed against the emulsion or sensitized side of the plate. Light is passed through the film and the images thus printed on the rear of the plate. By this arrangement the images are correctly positioned and only the thickness of the film separates the sensitized surfaces of the plate and the film. The next step consists in applying a translucent coating to the sensitized side of either of the plates, very good results having been had by coating the front side of the rear plate 11. This coating can be applied with an air spray and being substantially without appreciable thickness permits the two printed emulsion layers 12 and 13 to be brought approximately into contact.

The coating may be of any quick drying lacquer, or one of the many coating liquids of the collodion type, so as to give a milky white apearance and obscure the picture which is coated under ordinary light conditions where the light is directed upon the plate entirely from the front side and is excluded from the rear side.

The pictures being produced on the two plates and all parts being of the same size, the said plates are placed together and secured in permanent registration by a marginal adhesive binding tape 14. It is very important that the plates be permanently held together and exact registration secured. For instance the hair, the hand, the glass and the straws in the pictures must be identical as to registration and size so that when the plates are assembled there shall be no overlapping or distortion of the two images.

The assembled plates are inserted in the frame 15 at the front of the illuminating box 16 and secured in said frame by a bezel 17. A suitable electric lamp 18 is mounted in the box and suitable means (not shown) is provided for intermittently lighting and extinguishing said lamp. When the lamp 18 is extinguished, one viewing the display from the front of the box will be able to observe only the picture shown on the plate 11. This will be so because the coating applied to the front side of the rear plate will obscure the rear picture, said coating being sufficiently opaque for this purpose when the lamp 18 is extinguished.

When the lamp 18 is illuminated, the rays of light will be sufficiently powerful to penetrate the coating and in addition said coating will act to diffuse the light so that not only will the picture on the front plate 10 be entirely obliterated, but an even illumination and a natural appearance will be given to the illuminated picture. In some instances, particularly as is shown in Figures 1 and 2, better results are had by printing the picture of plate 10 a little lighter and not as dark or as dense as the picture of plate 11, thus permitting the light rays to more readily penetrate the front picture.

One of the very important features and causes of success of the invention is the use of the thin opaque or translucent coating which permits the two photographic images to be brought substantially into contact instead of separating them by the thickness of a glass plate, as has been done in similar efforts. This not only assures a registration but prevents lateral light rays entering between the pictures and causing distortion. It also prevents a blurred effect when the picture is viewed from an angle instead of from directly in front, when illuminated. The exact registration coupled with the frequent flashing of the lamp gives a very realistic and antimated production and the display is so realistic as to command attention.

In Figures 5, 6 and 7, I have shown another form of the invention in which the front plate 10' has produced on the rear side thereof an object A, while the rear plate 11' has produced thereon an object B in addition to other images. The rear side of the plate 10' is coated with an opaque or translucent coating the same as the other plates.

In the particular illustration used, an iceless refrigerator is depicted by the image A on the front plate and the door of the refrigerator is closed. When the lamp 18 is extinguished only the refrigerator A will be visible when the display is observed, because the coating will obscure the picture on the rear plate. On the rear plate the door of the refrigerator is open to show the contents and a young woman is standing by the refrigerator shown in the act of placing fruit therein. The image B is made to register with the image A in outline and by printing the image B darker the image A will be eliminated when the lamp 18 is lighted. Alternate lighting of the lamp will produce the two pictures in rapid succession.

I am aware that transparencies have been produced wherein animated scenes are alternately displayed by periodical elimination, but so far as I know these have been done by means of drawings and not by photography. The step of coating the printed side of one of the plates, whereby the said printed sides may be brought into intimate relation is novel in this art and is very important because it enables the images to be exactly registered and excludes lateral light rays which would be present if the sensitized surfaces were separated by the thickness of a sheet of glass or the like. Lateral light rays would distort the pictures when illuminated, particularly if viewed from an angle instead of directly in front. The posing of the subject and making two negatives wherein the images register in outline and position is an important feature, as is also the reversing of the film negative to properly print the image on the rear side of the front plate.

Various changes in the size and shape of the different parts, as well as modifications and alterations, may be made within the scope of the appended claims.

Having illustrated and described preferred forms of the invention, what I claim, is:

1. The method of producing transparencies for alternate display of a pair of different images, which consists in photographically printing on the sensitized sides of a pair of transparent plates two images to be displayed, and after one of the plates is photographically printed with its image to be displayed coating the printed emulsion side of the plate with a translucent substance, and securing said plates together with the printed sides next to each other and separated only by the coating.

2. The method of producing alternately changeable display transparencies, which consists in photographically printing from separate negatives different images of the same subject on the sensitized sides of transparent plates in such positions that the images on one plate will register in size and position with the images on the other plate, coating the printed emulsion side of one of the plates with a translucent substance, and securing the plates in permanent relation with the printed sides next to each other and with the images of one plate in exact registration with the images of the other plate.

3. The method of producing alternately changeable display transparencies, which consists in photographically printing from separate negatives images of the same subject on the sensitized sides of transparent plates in such positions that the images on one plate will register in size and position with the images on the other plate, printing the images on one plate heavier and darker than on the other plate, coating the printed emulsion side of one of the plates with a translucent substance, and securing the plates in permanent relation with the darker image on the rear plate and with the images in exact registration and next to each other.

4. The method of producing transparencies for alternate display of a pair of different images of the same subject corresponding as to all elements except particular portions which are to show alternate changes, which consists in photographically printing on the front sensitized side of a transparent plate an image to be displayed, inverting a film and photographically printing on the rear sensitized side of another transparent plate, a second image of the same subject registering with the first as to all features except portions intended for alternate display, coating the printed side of one of the plates with a translucent substance, and securing said plates together with their printed sides next to each other.

5. A transparency for the alternate display of a pair of different images, comprising a pair of transparent plates having adjacent emulsion sides, each bearing a printed photographic image, one of said sides having a thin coating of translucent material thereon, and means for securing said plates together with the printed images separated only by the said translucent coating.

6. A transparency for the alternate display of a pair of different photographic images, comprising a pair of attached transparent plates having adjacent emulsion sides each bearing a printed photographic image, and a translucent coating on at least one of said emulsion sides, constituting the sole partition between said images.

7. A transparency for the alternate display of a pair of images of the same subject identical as to most features but differing as to particular portions which are intended to show alternate changes, comprising a pair of transparent plates, having adjacent emulsion sides, both bearing different printed images of the same subject, registering as to like portions of the images, one of said sides having a thin coating of translucent material thereon, constituting the sole partition between the printed images.

8. A transparency for alternate display of different images of the same subject, including a pair of transparent plates, an image photographically printed on one side of one of the plates, the other plate having another image of the same subject photographically printed on one side, one of the plates having its printed side coated with a translucent substance, the plates being rigidly secured together with the printed sides facing each other so that the corresponding parts of the images exactly register in outline and position, one of said images having elements contrasting with elements of the other image.

In testimony whereof I affix my signature.

LUTHER J. HIGGINBOTHAM.